US010332558B2

(12) United States Patent
Hayashi et al.

(10) Patent No.: US 10,332,558 B2
(45) Date of Patent: Jun. 25, 2019

(54) EDITING APPARATUS AND METHOD FOR EDITING A MOVING IMAGE

(71) Applicant: SONY CORPORATION, Tokyo (JP)

(72) Inventors: Naoki Hayashi, Chiba (JP); Takehisa Gokaichi, Kanagawa (JP); Shintaro Kajiwara, Tokyo (JP); Hiroki Narita, Kanagawa (JP); Masaki Mikamo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 110 days.

(21) Appl. No.: 14/571,762

(22) Filed: Dec. 16, 2014

(65) Prior Publication Data

US 2015/0187386 A1 Jul. 2, 2015

(30) Foreign Application Priority Data

Dec. 27, 2013 (JP) .................. 2013-272513

(51) Int. Cl.
| | |
|---|---|
| G11B 27/00 | (2006.01) |
| H04N 5/93 | (2006.01) |
| G11B 27/02 | (2006.01) |
| G11B 27/10 | (2006.01) |
| G11B 27/34 | (2006.01) |
| H04N 5/783 | (2006.01) |
| G05D 1/00 | (2006.01) |

(52) U.S. Cl.
CPC .......... *G11B 27/005* (2013.01); *G11B 27/02* (2013.01); *G11B 27/105* (2013.01); *G11B 27/34* (2013.01); *H04N 5/783* (2013.01)

(58) Field of Classification Search
USPC ............ 386/278, 280, 282; 701/1, 400, 418
See application file for complete search history.

(56) References Cited

U.S. PATENT DOCUMENTS

| 7,941,032 B2 * | 5/2011 | Agata | G11B 27/034 386/243 |
|---|---|---|---|
| 2006/0136173 A1 * | 6/2006 | Case, Jr. | A63B 24/00 702/182 |
| 2007/0150188 A1 * | 6/2007 | Rosenberg | G01C 21/3647 701/431 |
| 2010/0217518 A1 * | 8/2010 | Chang | G01C 21/3688 701/533 |
| 2011/0046883 A1 * | 2/2011 | Ross | G01C 21/26 701/533 |
| 2014/0068439 A1 * | 3/2014 | Lacaze | G06F 3/04855 715/720 |

FOREIGN PATENT DOCUMENTS

JP H08-287656 A 11/1996

* cited by examiner

*Primary Examiner* — Daquan Zhao
(74) *Attorney, Agent, or Firm* — Chip Law Group

(57) ABSTRACT

There is provided an editing apparatus, including a route information generation section which generates route information from an imaging start point up to an imaging end point of a moving image, and a control information generation section which generates control information for controlling a reproduction speed of the moving image based on the route information.

22 Claims, 13 Drawing Sheets

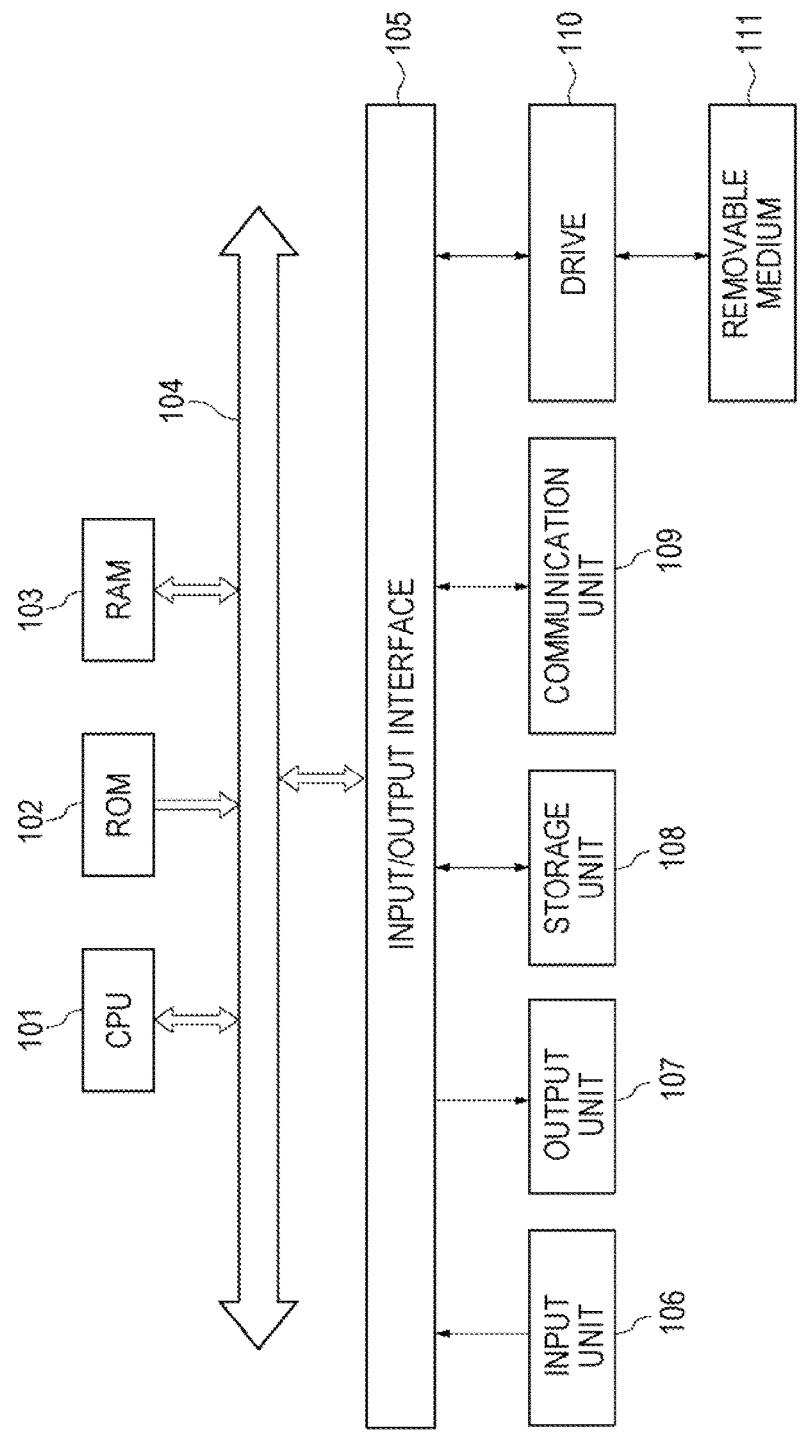

EDITING APPARATUS AND METHOD FOR EDITING A MOVING IMAGE

CROSS REFERENCE TO RELATED APPLICATIONS

This application claims the benefit of Japanese Priority Patent Application JP 2013-272513 filed Dec. 27, 2013, the entire contents of which are incorporated herein by reference.

BACKGROUND

The present disclosure relates to an editing apparatus, a reproduction apparatus, an editing method, a reproduction method and a program, and specifically relates to an editing apparatus, a reproduction apparatus, an editing method, a reproduction method and a program which can provide a more favorable user interface.

In related art, editing such as reproduction at a speed different to a usual reproduction speed, for example, reproduction in fast-forward with a speed faster than a usual reproduction speed, or reproduction in slow motion with a speed slower than a usual reproduction speed (hereinafter, called slow reproduction), can be performed in an editing apparatus which edits a reproduction speed of a moving image.

For example, JP H8-287656A discloses an editing apparatus which can edit a slow reproduction section, by displaying positions of points on a time axis of a slow reproduction time display section, and using a user interface so as to specify a slow reproduction start point and a slow reproduction end point.

SUMMARY

In addition to an editing apparatus such that disclosed in JP H8-287656A, a user interface is sought after in which a slow reproduction section can be set more easily, for a section desired by a user, and the slow reproduction section can be edited. The present disclosure is performed by considering such a situation, and can provide a more favorable user interface.

According to the first aspect of the present disclosure, there is provided an editing apparatus which includes an image reproduction section which reproduces a moving image, a track image generation section which generates a track image including at least a route image showing a track from a start point up to an end point corresponding to imaging positions at a time of imaging of the moving image, and an editing information acquisition section which acquires editing information for editing a reproduction speed of the moving image by using the track image.

According to the second aspect of the present disclosure, there is provided a reproduction apparatus which includes an image reproduction section which reproduces a moving image, and a track image generation section which generates a route image showing a track from a start point up to an end point corresponding to imaging positions at a time of imaging of the moving image, and a track image including an imaging point display displayed superimposed on the route image so as to move in accordance with an imaging time of the moving image, wherein, when a moving image corresponding to a variable speed reproduction section displayed in the route image is reproduced by the image reproduction section, the track image generation section changes and generates a movement speed of the imaging point display in accordance with a reproduction speed of a changed moving image.

According to the first aspect of the present disclosure, there is provided an editing method or a program which includes reproducing a moving image, generating a track image including at least a route image showing a track from a start point up to an end point corresponding to imaging positions at a time of imaging of the moving image, and acquiring editing information for editing a reproduction speed of the moving image by using the track image.

According to the second aspect of the present disclosure, there is provided a reproduction method or a program which includes reproducing a moving image, and generating a route image showing a track from a start point up to an end point corresponding to imaging positions at a time of imaging of the moving image, and a track image including an imaging point display displayed superimposed on the route image so as to move in accordance with an imaging time of the moving image, wherein, when a moving image corresponding to a variable speed reproduction section displayed in the route image is reproduced, a movement speed of an imaging point display is changed and generated in accordance with a reproduction speed of a changed moving image.

According to the first aspect of the present disclosure, a moving image is reproduced, a track image is generated which includes at least a route image showing a track from a start point up to an end point corresponding to imaging positions at a time of imaging of the moving image, and editing information is acquired which edits a reproduction speed of the moving image by using the track image.

According to the second aspect of the present disclosure, a moving image is reproduced, and a route image showing a track from a start point up to an end point corresponding to imaging positions at a time of imaging of the moving image, and a track image which includes an imaging point display displayed superimposed on the route image so as to move in accordance with an imaging time of the moving image, are generated. Also, when a moving image corresponding to a variable speed reproduction section displayed in the route image is reproduced, a movement speed of the imaging point display is changed and generated in accordance with a reproduction speed of a changed moving image. According to an embodiment of the present disclosure, a more favorable user interface can be provided.

BRIEF DESCRIPTION OF THE DRAWINGS

FIG. 13 is a block diagram which shows a configuration example of a computer.

DETAILED DESCRIPTION OF THE EMBODIMENT(S)

Hereinafter, specific embodiments applicable to the present disclosure will be described in detail with reference to the figures.

Figure 1:
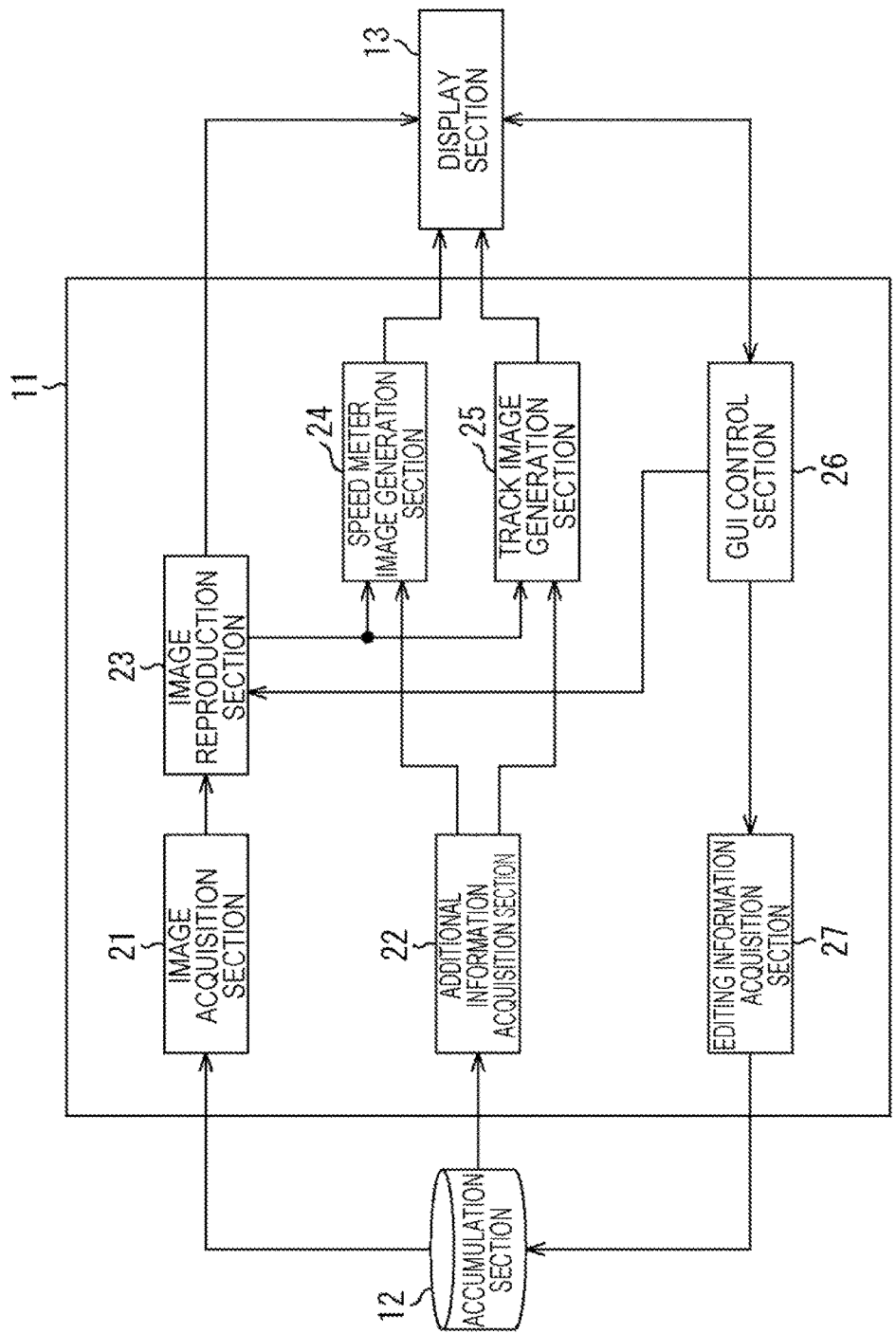
FIG. 1 is a block diagram which shows a configuration example of an embodiment of an editing apparatus applicable to an embodiment of the present disclosure.

FIG. 1 is a block diagram which shows a configuration example of an embodiment of an editing apparatus applicable to an embodiment of the present disclosure. As shown in FIG. 1, an accumulation section 12 and a display section 13 are connected to an editing apparatus 11, and editing of a reproduction speed of a moving image is performed, for example, by having a user operate the editing apparatus 11 while moving images accumulated in the accumulation section 12 are displayed on the display section 13.

Note that, in the present embodiment, a moving image is constituted from a plurality of images (still images) captured with a prescribed frame rate (for example, usually 30 Frames Per Second (fps)), and is reproduced in an order according to an imaging time of each of the images. Further, the frame rate at the time of imaging of a moving image is set to be able to change in accordance with a function of an imaging apparatus, and slow reproduction is performed, for example, when a moving image captured with a half frame rate (for example, 60 fps, 120 fps or the like) is reproduced with a usual frame rate (for example, 30 fps).

The accumulation section 12 is a storage section such as a hard disc or a nonvolatile memory, for example, and may be a configuration which is built into a computer having the editing apparatus 11, or may be a configuration which is connected to the editing apparatus 11 via a network, which is not illustrated. For example, a plurality of moving images captured at a same time by a plurality of imaging apparatus are accumulated, in the accumulation section 12, as collected moving image files along with additional information which becomes additional information for these moving images. Speed information and position information recorded in association with an imaging time at which the moving images are captured, editing information generated by the editing apparatus 11, or the like are included in this additional information.

The display section 13 is a display panel such as a Liquid Crystal Display (LCD) or an organic Electro Luminescence (EL) panel, for example, and displays images supplied from the editing apparatus 11. As will be described later with reference to FIG. 2, the display section 13 displays a moving image reproduced by the editing apparatus 11, and a Graphical User Interface (GUI) for performing editing for this moving image. Further, the editing apparatus 11 is constituted by including an image acquisition section 21, an additional information acquisition section 22, an image reproduction section 23, a speed meter image generation section 24, a track image generation section 25, a GUI control section 26, and an editing information acquisition section 27.

The image acquisition section 21 supplies moving images specified as an editing target by a user, for example, to the image reproduction section 23 by reading from the accumulation section 12. Hereinafter, while a description will be made in the present embodiment which sets two moving images captured at a same time as an editing target, one moving image may be set as an editing target, or three of more moving images captured at a same time may be set as an editing target, for example.

The additional information acquisition section 22 reads additional information collected in a moving image file, along with the moving images read from the accumulation section 12 by the image acquisition section 21, from the accumulation section 12. Also, the additional information acquisition section 22 supplies speed information included in the additional information to the speed meter image generation section 24, and supplies position information included in the additional information to the track image generation section 25.

The image reproduction section 23 reproduces the two moving images supplied from the image acquisition section 21 by adjusting the imaging times of these moving images, and displays the reproduced moving images on the display section 13. Note that, the image reproduction section 23 can reproduce, as a reproduction target, moving images in which a portion of a usual frame rate and a portion of a half frame rate are mixed, or can slow reproduce a portion of a half frame rate with a high resolution. Further, the image reproduction section 23 supplies the imaging times of the moving images to the speed meter image generation section 24 and the track image generation section 25.

The speed meter image generation section 24 generates a speed meter image showing a speed corresponding to the imaging time supplied from the image reproduction section 23, in accordance with speed information supplied from the additional information acquisition section 22, and displays the generated speed meter image on the display section 13. That is, the speed meter image generation section 24 generates a speed meter image showing a speed, in accordance with a timing at which a moving image is reproduced, at the time when this moving image is captured. Note that, instead of speed information being supplied from the additional information acquisition section 22, information capable of calculating speed information, for example, geographical position information and time information when imaging, may also be supplied. In this case, the speed meter image generation section 24 can generate a speed meter image by calculating a speed from the geographical position information and the time information.

The track image generation section 25 generates a route image according to the position information (for example, geographical position information) supplied from the additional information acquisition section 22, generates a track image, on this route image, so that an imaging point pointer moves in accordance with the imaging time supplied from the image reproduction section 23, and displays the generated images on the display section 13. That is, the route image shows a track of the position information from a start point up to a goal point in which a moving image of an editing target moves at the time of imaging. Further, the imaging point pointer shows an imaging point on the route image based on the position information corresponding to the imaging time.

The GUI control section 26 functions as a control information generation section which generates control information for controlling a reproduction speed of a moving image. The GUI control section 26 controls the display of a GUI part used to perform editing for a moving image displayed on the display section 13, acquires operation information for this GUI part, and performs a control corresponding to this operation. Note that, the controls performed by the GUI control section 26 will be described later with reference to FIG. 5. The editing information acquisition section 27 acquires, at the time when an operation is performed which saves editing content, editing information according to this editing content, by having a user perform editing of a moving image by using the GUI part displayed on the display section 13. Also, the editing information acquisition section 27 records the acquired editing information to a moving image file to which moving images of an editing target accumulated in the accumulation section 12 are recorded, as additional information of this moving image.

In the editing apparatus 11 constituted such as this, when a user performs an operation which starts editing of a reproduction speed of a moving image, by specifying a moving image of an editing target, the image editing apparatus 11 displays an editing screen, on which a moving image read from the accumulation section 12 is displayed, on the display section 13. Next, FIG. 2 is a figure which shows a display example of an editing screen displayed on the display section 13.

Figure 2:
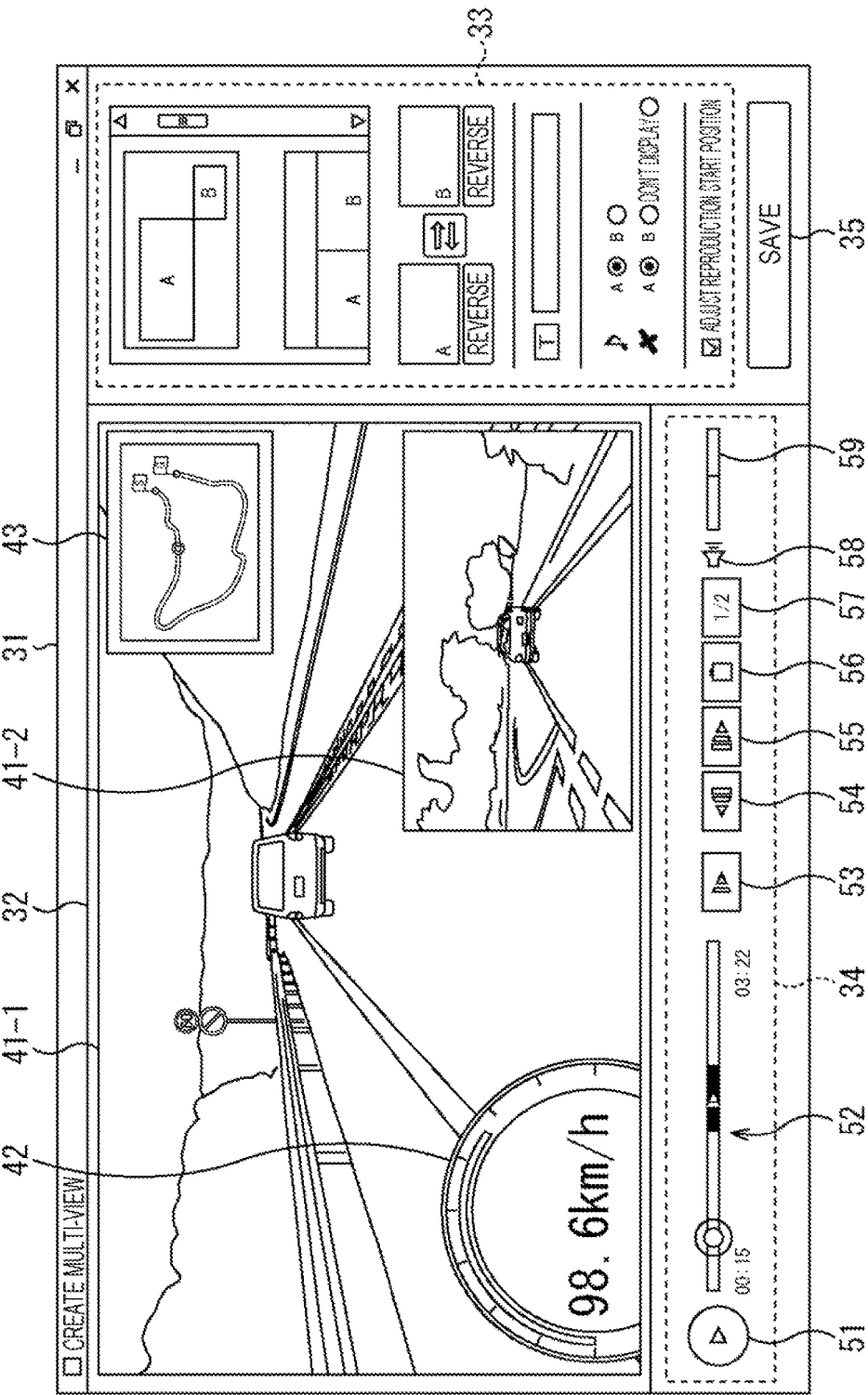
FIG. 2 is a figure which shows a display example of an editing screen.

A main screen 32, a display specification GUI display section 33, a reproduction speed editing GUI display section 34, and a save button 35 are displayed on an editing screen 31 such as shown in FIG. 2. Moving image display sections 41-1 and 41-2, a speed meter image display section 42, and a track image display section 43 are displayed on the main screen 32. In the display example of FIG. 2, the layout of the main screen 32 is constituted by having the moving image display section 41-1 included on the entire main screen 32, and the moving image display section 41-2 included on the right bottom, the speed meter image display section 42 included on the left bottom, and the track image display section 43 included on the right top, by being superimposed on the moving image display section 41-1. Further, the main screen 32 will be assumed to have a layout the same as a reproduction screen when reproducing a moving image edited by the editing apparatus 11. Note that, the main screen 32 is not limited to such a layout.

Two moving images reproduced by the image reproduction section 23 are displayed, by matching the timing of the respective imaging times, on the moving image display sections 41-1 and 41-2. A speed meter image generated by the speed meter image generation section 24 is displayed on the speed meter image display section 42, and the speed meter image changes in accordance with the imaging time of the moving images displayed on the moving image display sections 41-1 and 41-2.

A track image generated by the track image generation section 25 is displayed on the track image display section 43. Note that, the track image displayed on the track image display section 43 includes a function as an editing GUI part for performing editing of a reproduction speed of a moving image, and editing information can be generated, by the editing apparatus 11, in accordance with an operation for the track image. Note that, editing of a reproduction speed of a moving image using the track image will be described later with reference to FIG. 3 and FIG. 4. GUI parts used to specify the layout or the like of the main screen 32 are displayed on the display specification GUI display section 33. For example, a GUI part which specifies the arrangement of the moving image display sections 41-1 and 41-2, a GUI part which specifies the replacement of the moving images displayed on the moving image display section 41-1 and 41-2, or the like are displayed on the display specification GUI display section 33. Further, a GUI part which inputs characters to be displayed on the moving image display sections 41-1 and 41-2, a GUI part which specifies a moving image to reproduce audio from among the two moving images, a GUI part which specifies a display of position information, a GUI part which instructs an adjustment of a reproduction start position of the two moving images, or the like are displayed on the display specification GUI display section 33.

A GUI part used to perform editing of a reproduction speed when reproducing a moving image of an editing target is displayed on the reproduction speed editing GUI display section 34. For example, a reproduction instruction button 51, a seek bar 52, a slow portion setting button 53, a reverse direction movement button 54, a travelling direction movement button 55, a slow portion deletion button 56, a reproduction speed instruction drop down list 57, an audio reproduction instruction button 58, and an audio amount adjustment slider 59 are displayed on the reproduction speed editing GUI display section 34.

When the reproduction instruction button 51 operates at the time when instructing reproduction of a moving image, for example, when an operation for the reproduction instruction button 51 (for example, a click operation using a mouse, a touch operation by a user's finger or the like) is performed, reproduction of a moving image and a temporary stop are switched. The seek bar 52 is constituted by a time line showing the entire reproduction time of a moving image, and a slider showing a reproduction position on the time line, and when an operation is performed to move the slider, the reproduction position changes in accordance with the slider after this moving. Further, the entire reproduction time of a moving image of an editing target (the length of the time line) is display on the right bottom of the seek bar 52, and the reproduction time corresponding to the reproduction position of the moving image is displayed on the left bottom of the seek bar 52.

The slow portion setting button 53 operates at the time when instructing a setting of a slow reproduction section which is a section performing a slow reproduction. For example, a start point of the slow reproduction section is set when the slow portion setting button 53 is operated at the time when a moving image is reproduced with a usual speed, and an end point of the slow reproduction section is set when the slow portion setting button 53 is operated at the time when the moving image is slow reproduced.

The reverse direction movement button 54 is operated at the time when instructing that the slow reproduction section is to be moved in a reverse direction with respect to the travelling direction of the reproduction time, and the travelling direction movement button 55 is operated at the time when instructing that the slow reproduction section is to be moved in the travelling direction of the reproduction time.

The slow portion deletion button 56 is operated at the time when deleting the set slow reproduction section. The reproduction speed instruction drop down list 57 is operated at the time when selecting a reproduction speed when setting the slow reproduction section. For example, when an operation is performed for the reproduction speed instruction drop down list 57, a list is displayed, in which a plurality of slow reproduction speeds (for example, ½, ¼, ⅛ or the like) are recorded, and a slow reproduction speed is selected from among these. The audio reproduction instruction button 58 is operated at the time when instructing whether or not audio is to be reproduced along with a moving image, and the audio amount adjustment slider 59 is operated at the time when adjusting the audio amount at the time when reproducing audio has been instructed.

The save button 35 is operated at the time when editing operations using the GUI parts displayed on the display specification GUI display section 33 and the reproduction speed editing GUI display section 34 are completed, and this editing content is saved. For example, when an operation is performed for the save button 35, the editing information acquisition section 27 of FIG. 1 acquires editing information according to the editing content at the time when the operation is performed, and records the acquired editing information to the accumulation section 12 as additional information of a moving image of an editing target.

Next, editing of a reproduction speed using a track image 60 displayed on the track image display section 43 will be described with reference to FIG. 3 and FIG. 4. For example, the track image 60 is displayed by having an imaging point 62 corresponding to position information according to an imaging time of a moving image of an editing target superimposed on a route image 61 showing a track according to position information of the moving image of an editing target. That is, similar to the seek bar 52 of FIG. 2, in the track image 60, the route image 61 corresponds to a time line showing the entire reproduction time of a moving image, and the imaging point 62 corresponds to a slider showing a reproduction position on this time line. Further, a start flag 63 showing a position at which imaging starts, and a goal flag 64 showing a position at which imaging ends, are displayed at both ends of the route image 61.

For example, when reproduction of a moving image is started, the imaging point 62 moves on the route image 61 from the start flag 63 in accordance with the reproduction of the moving image. Then, at the time when the imaging point 62 moves to the position shown in the track image 60-1, a slow reproduction start portion is specified by having a user performed an operation for the slow portion setting button 53. In accordance with this, the GUI control section 26 (FIG. 1) acquires this operation information, and as shown in track image 60-2, a slow reproduction start flag 65 is displayed at the position where the imaging point 62 is displayed. At the same time, the GUI control section 26 performs an instruction so as to slow reproduce the moving image for the image reproduction section 23, and the image reproduction section 23 starts slow reproduction of the moving image.

At this time, the change of imaging time supplied from the image reproduction section 23 to the speed meter image generation section 24 and the track image generation section 25 also becomes a speed according to slow reproduction of the moving image. In this way, the speed meter image generated by the speed meter image generation section 24 changes with a speed according to slow reproduction, and the track image 60 generated by the track image generation section 25 changes with a speed according to slow reproduction.

After this, at the time when the imaging point 62 moves to the position shown in the track image 60-3, by having slow reproduction of the moving image performed, a slow reproduction end portion is specified by having a user perform an operation for the slow portion setting button 53. In accordance with this, the GUI control section 26 displays a slow reproduction end flag 66 at the position where the imaging point 62 is displayed, such as shown in the track image 60-4, by acquiring this operation information. At the same time, the GUI control section 26 performs an instruction so as to end slow reproduction of the moving image for the image reproduction section 23, and the image reproduction section 23 performs reproduction with a usual speed by ending slow reproduction of the moving image.

At this time, the change of imaging time supplied from the image reproduction section 23 to the speed meter image generation section 24 and the track image generation section 25 also becomes a usual speed of the moving image. In this way, the speed meter image generated by the speed meter image generation section 24 changes with a speed according to a usual speed, and the track image 60 generated by the track image generation section 25 changes with a speed according to a usual speed.

Note that, the slow reproduction end flag 66 displayed at the portion where slow reproduction section ends may be omitted, and the portion where slow reproduction section ends can be recognized, for example, by only changing the color from the slow reproduction start flag 65 up to the portion where slow reproduction section ends. That is, for example, in the case where the slow reproduction section is short or the like, the slow reproduction start flag 65 and the slow reproduction end flag 66 will often be displayed overlapping, and the slow reproduction start flag 65 may only be displayed as a mark showing the portion where slow reproduction section starts. In this case, editing for the slow reproduction section can be performed by using the reproduction speed editing GUI display section 34, such as that which will be described later.

In this way, in the editing apparatus 11, a section from the slow reproduction start flag 65 up to the slow reproduction end flag 66 can be set as a slow reproduction section, by using the track image 60. Further, the slow reproduction section can be set for a plurality of places, and can be moved after being set. For example, at the time when reproduction is performed with a usual speed of a moving image, after the slow reproduction end flag 66 has been set, a user specifies a slow reproduction start portion and a slow reproduction end portion by performing an operation similar to that described above. In accordance with this, the GUI control section 26 sets a section from the slow reproduction start flag 67 up to the slow reproduction end flag 68 as a second location slow reproduction section, such as shown in the track image 60-5 of FIG. 4, by acquiring this operation information.

In addition, for example, when a user performs an operation to move the slow reproduction end flag 68, the GUI control section 26 causes the second location slow reproduction section to be compressed into a section from the slow reproduction start flag 67 up to the slow reproduction end flag 68a, such as shown in the track image 60-6, by acquiring this operation information.

Further, for example, when a user performs an operation which selects the first location slow reproduction section (for example, an operation for touching the portion where the slow reproduction section is displayed), the GUI control section 26 causes the imaging point 62 to move to the slow reproduction start portion of the first location slow reproduction section, such as shown in the track image 60-7, by acquiring this operation information. Then, when a user performs an operation to move the first location slow reproduction section, the GUI control section 26 causes the second location slow reproduction section to move to a section from the slow reproduction start flag 65a up to the slow reproduction end flag 66a, such as shown in the track image 60-8, by acquiring this operation information.

Note that, in the track image 60, for example, in order to understand that flags other than the start flag 63, the goal flag 64 or the like are able to be operated differently, the slow reproduction start flag 65 and the slow reproduction end flag 66 are displayed with colors different to these other flags. In addition, in FIG. 3 and FIG. 4, while an imaging point is shown on the route image 61, by using a pointer (mark) such as the imaging point 62, the display of an imaging point is not limited to a pointer, and this imaging point may be set, for example, so that the color of the route image 61 is different at a border. That is, for example, by displaying the section from the start point shown by the start flag 63 up to the imaging point, and the section from this imaging point up to the end point shown by the goal flag 64, with different colors, the imaging point can be shown.

Figure 3:
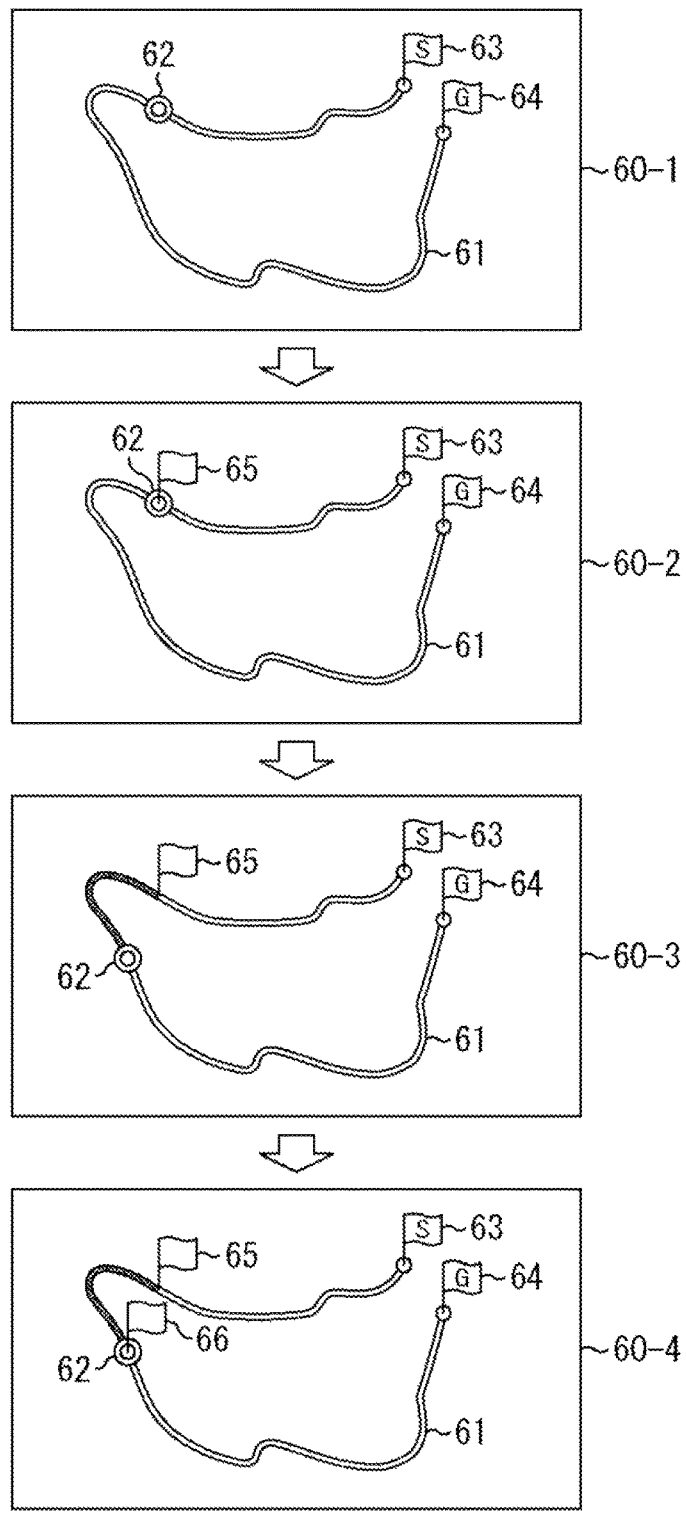
FIG. 3 is a figure which describes editing of a reproduction speed using a track image.
Figure 4:
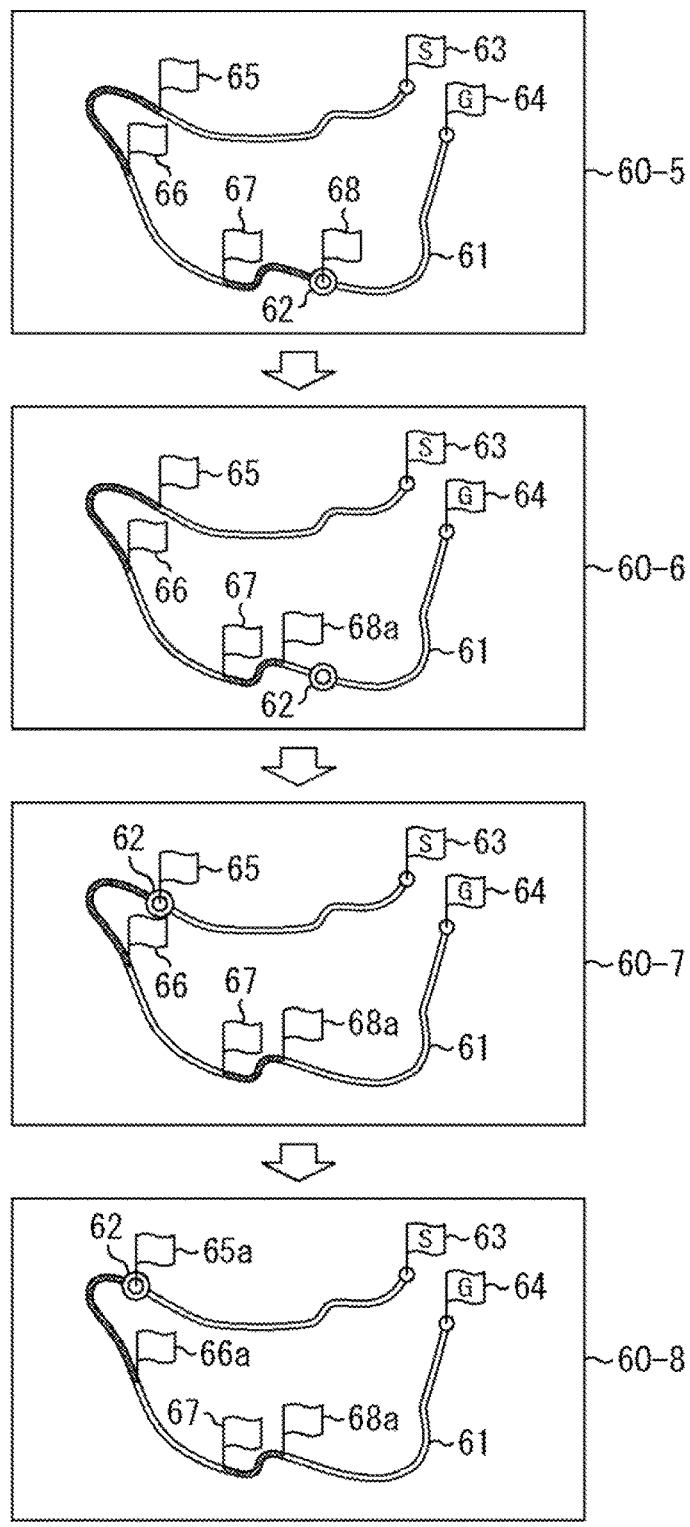
FIG. 4 is a figure which describes editing of a reproduction speed using a track image.

Further, while the slow reproduction section is set based on an operation of a user in the description with reference to FIG. 3 and FIG. 4, the slow reproduction section can be automatically set to some extent, for example. For example, a section in which the speed significantly changes may be determined to be a noteworthy section, based on speed information (information of a change amount of geographical position information with respect to time information), and may be displayed on the route image 61, as a candidate to automatically set this noteworthy section to a slow reproduction section. In this case, a user can perform a specification so that a slow reproduction section displayed as a candidate is saved as editing information, or can perform a specification so that a length or position of a slow reproduction section displayed as a candidate is saved as editing information after adjustment. Further, a slow reproduction section displayed as a candidate may be automatically saved as editing information.

Figure 5:
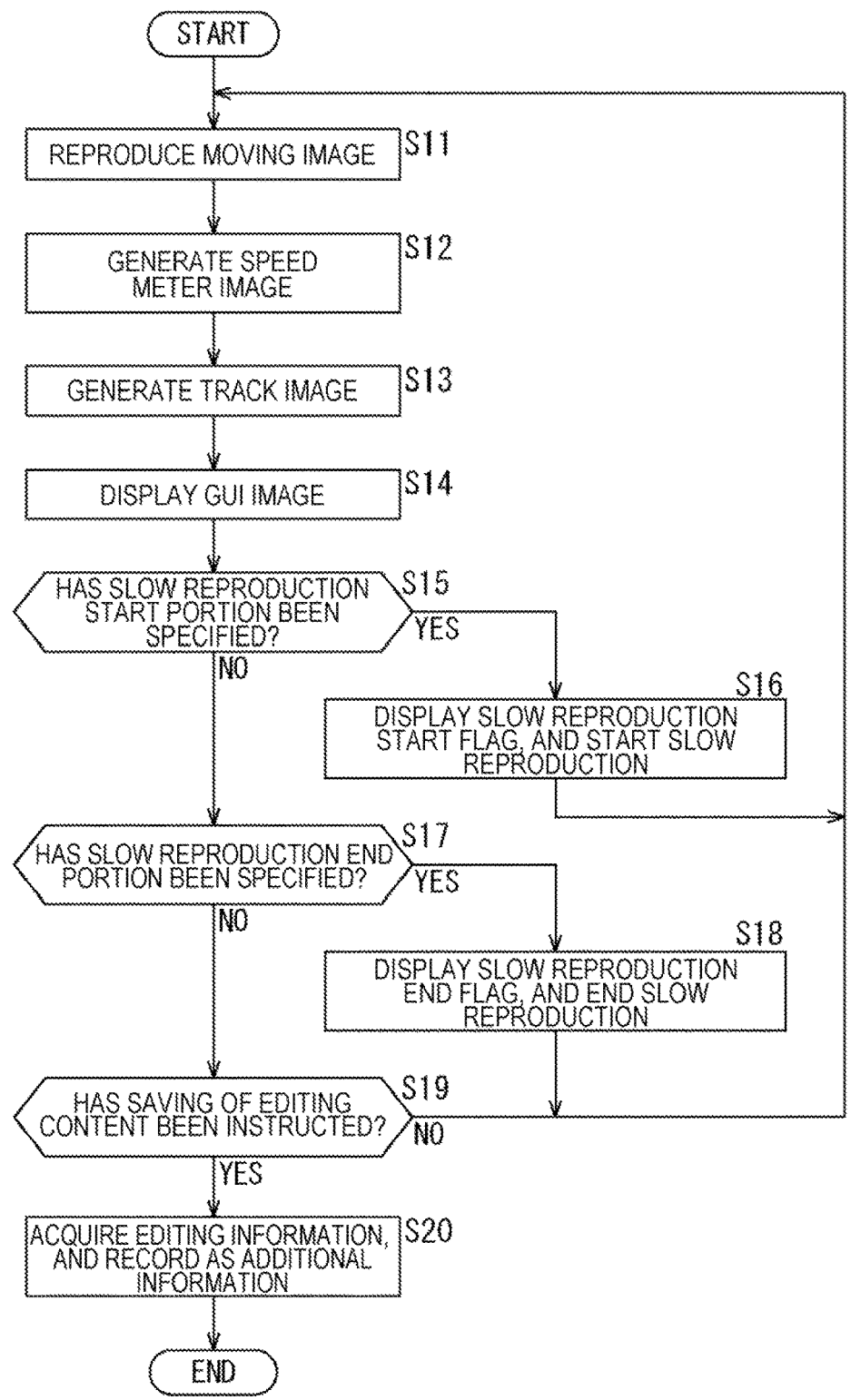
FIG. 5 is a flow chart which describes an editing process of a reproduction speed using a track image.

Next, FIG. 5 is a flow chart which describes an editing process of a reproduction speed using a track image. For example, a process is started when performing an operation which starts editing of the reproduction speeds of moving images, by specifying moving images of an editing target, and in step S11, the image acquisition section 21 supplies two moving images specified as an editing target to the image reproduction section 23 by reading from the accumulation section 12. Then, the image reproduction section 23 reproduces the two moving images supplied from the image acquisition section 21 by adjusting the imaging times of these moving images, and moving images are reproduced and displayed on the moving image display sections 41-1 and 41-2 of the editing screen 31 (FIG. 2) displayed on the display section 13.

In step S12, the additional information acquisition section 22 reads additional information of the moving images of a reproduction target from the accumulation section 12, and supplies speed information included in this additional information to the speed meter image generation section 24. Further, the image reproduction section 23 supplies the imaging time of the reproduced moving images to the speed meter image generation section 24. In this way, the speed meter image generation section 24 generates a speed meter image showing a speed corresponding to the imaging time supplied from the image reproduction section 23, in accordance with the speed information supplied from the additional information acquisition section 22. Then, the speed meter image generation section 24 displays the speed meter image on the speed meter image display section 42 of the editing screen 31 displayed on the display section 13.

In step S13, the additional information acquisition section 22 supplies position information included in the additional information of the moving images of a reproduction target to the track image generation section 25, and the image reproduction section 23 supplies the imaging time of the reproduced moving images to the track image generation section 25. In this way, the track image generation section 25 generates a route image according to the position information supplied from the additional information acquisition section 22, and generates the track image 60 (FIG. 3) so that an imaging point pointer moves, on this route image, in accordance with the imaging time supplied from the image reproduction section 23. Then, the track image generation section 25 displays the track image 60 on the track image display section 43 of the editing screen 31 displayed on the display section 13.

In step S14, the GUI control section 26 displays the display specification GUI display section 33, the reproduction speed editing GUI display section 34 and the save button 35 on the editing screen 31 displayed on the display section 13, such as shown in FIG. 2. In step S15, the GUI control section 26 determines whether or not a slow reproduction start portion has been specified. For example, when a user performs an operation for the slow portion setting button 53 of the display specification GUI display section 33, at the time when a moving image is reproduced with a usual speed, the GUI control section 26 determines that a slow reproduction start portion has been specified.

In the case where the GUI control section 26 determines, in step S15, that a slow reproduction start portion has been specified, the process proceeds to step S16. In step S16, the GUI control section 26 displays the slow reproduction start flag 65 at the position where the imaging point 62 is displayed, such as shown in the track image 60-2 of FIG. 3. At the same time, the GUI control section 26 performs an instruction so as to slow reproduce a moving image for the image reproduction section 23, and the image reproduction section 23 starts slow reproduction of the moving image. After the process of step S16, the process returns to step S11, and hereinafter similar processes are repeated.

On the other hand, in the case where the GUI control section 26 determines, in step S15, that a slow reproduction start portion has not been specified, the process proceeds to step S17. In step S17, the GUI control section 26 determines whether or not a slow reproduction end portion has been specified. For example, when a user performs an operation for the slow portion setting button 53 of the display specification GUI display section 33, at the time when a moving image is slow reproduced, the GUI control section 26 determines that a slow reproduction end portion has been specified.

In the case where the GUI control section 26 determines, in step S17, that a slow reproduction end portion has been specified, the process proceeds to step S18. In step S18, the GUI control section 26 displays the slow reproduction end flag 66 at the position where the imaging point 62 is displayed, such as shown in the track image 60-4 of FIG. 3. At the same time, the GUI control section 26 performs an instruction so as to end slow reproduction of the moving image for the image reproduction section 23, and the image reproduction section 23 performs reproduction with a usual speed by ending slow reproduction of the moving image. After the process of step S18, the process returns to step S11, and hereinafter similar processes are repeated.

On the other hand, in the case where the GUI control section 26 determines, in step S17, that a slow reproduction end portion has not been specified, the process proceeds to step S19. In step S19, the GUI control section 26 determines whether or not saving of editing content has been instructed. For example, when a user performs an operation for the save button 35, the GUI control section 26 determines that saving of editing content has been instructed. In the case where the GUI control section 26 determines, in step S19, that saving of editing content has not been instructed, the process returns to step S11, and hereinafter similar processes are repeated. On the other hand, in the case where the GUI control section 26 determines, in step S19, that saving of editing content has been instructed, the process proceeds to step S20.

In step S20, the GUI control section 26 supplies the editing content at the present time (the slow reproduction start portion, the slow reproduction end portion, the slow reproduction speed or the like) to the editing information acquisition section 27, and the editing information acquisition section 27 acquires editing information including this editing content. Then, the editing information acquisition section 27 records the acquired editing information to a moving image file in which moving images of an editing target accumulated in the accumulation section 12 are recorded, as additional information of this moving image, and after the process of step S20, the process ends.

As described above, since the slow reproduction section can be set by using the track image 60 in the editing apparatus 11, a user will be aware of the section which becomes a noteworthy point on the travelled course, for example, and so a slow reproduction section can be easily set for this section. That is, in the case where a slow reproduction section is set by using the seek bar 52, while a section which becomes a noteworthy point will be difficult to locate with only the seek bar 52, a section which becomes a noteworthy point can be easily located, with the track image 60, based on this shape. Therefore, the editing apparatus 11 can provide a more favorable user interface than that of the related art.

Figure 6:
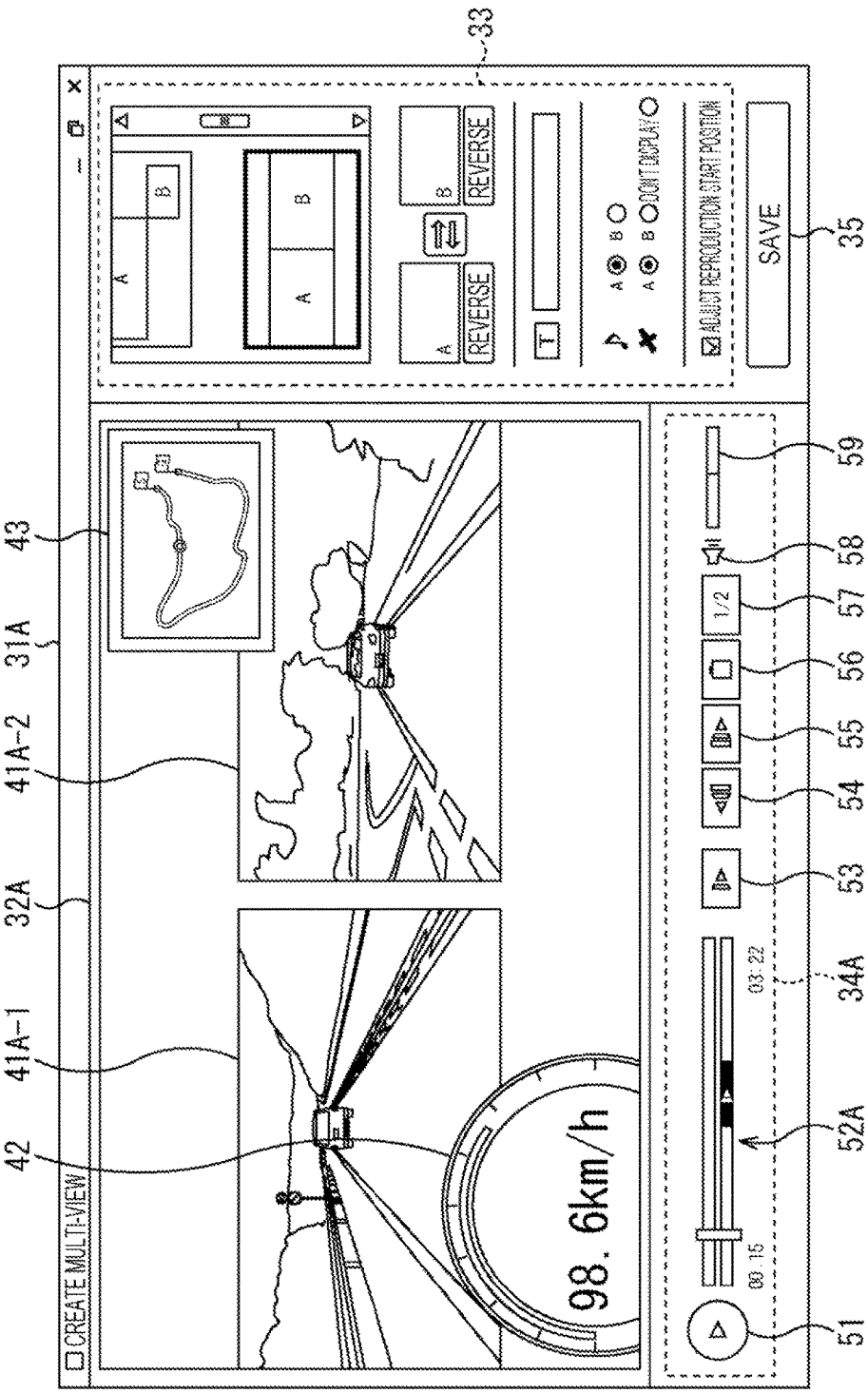
FIG. 6 is a figure which shows another display example of an editing screen.

Next, FIG. 6 is a figure which shows another display example of an editing screen displayed on the display section 13. As shown in FIG. 6, a main screen 32A, a display specification GUI display section 33A, a reproduction speed editing GUI display section 34, and a save button 35 are displayed on the editing screen 31A. Note that, the reproduction speed editing GUI display section 34 and the save button 35 are the same as those of the display on the editing screen 31 of FIG. 2.

The main screen 32A is displayed different to the main screen 32 of FIG. 2 for the point of the moving image display sections 41-1A and 41-2A being displayed side by side. Note that, the speed meter image display section 42 and the track image display section 43 are the same as those of the display on the main screen 32 of FIG. 2. In this way, in the editing apparatus 11, the arrangement of two moving images displayed on the editing screen 31 can be changed, in accordance with a selection of a user.

In the display specification GUI display section 33A, a seek bar 52A is displayed different to that of the display specification GUI display section 33 of FIG. 2. That is, in the seek bar 52A, it is constituted by having a dedicated time line for slow reproduction arranged in parallel beneath the time line displayed with usual moving image reproduction. Next, an editing process of a reproduction speed using a GUI part displayed on the reproduction speed editing GUI display section 34 will be described with reference to FIG. 7 through to FIG. 9. For example, when reproduction of a moving image is started with a usual speed (Slow OFF), a slider 71 moves on the seek bar 52, and when a user performs an operation for the reproduction instruction button 51, reproduction of the moving image temporarily stops. During such stopping of reproduction, a reproduction mark (a triangle facing the right) is displayed on the reproduction instruction button 51, such as shown in the reproduction speed editing GUI display section 34-1 of FIG. 7.

Figure 7:
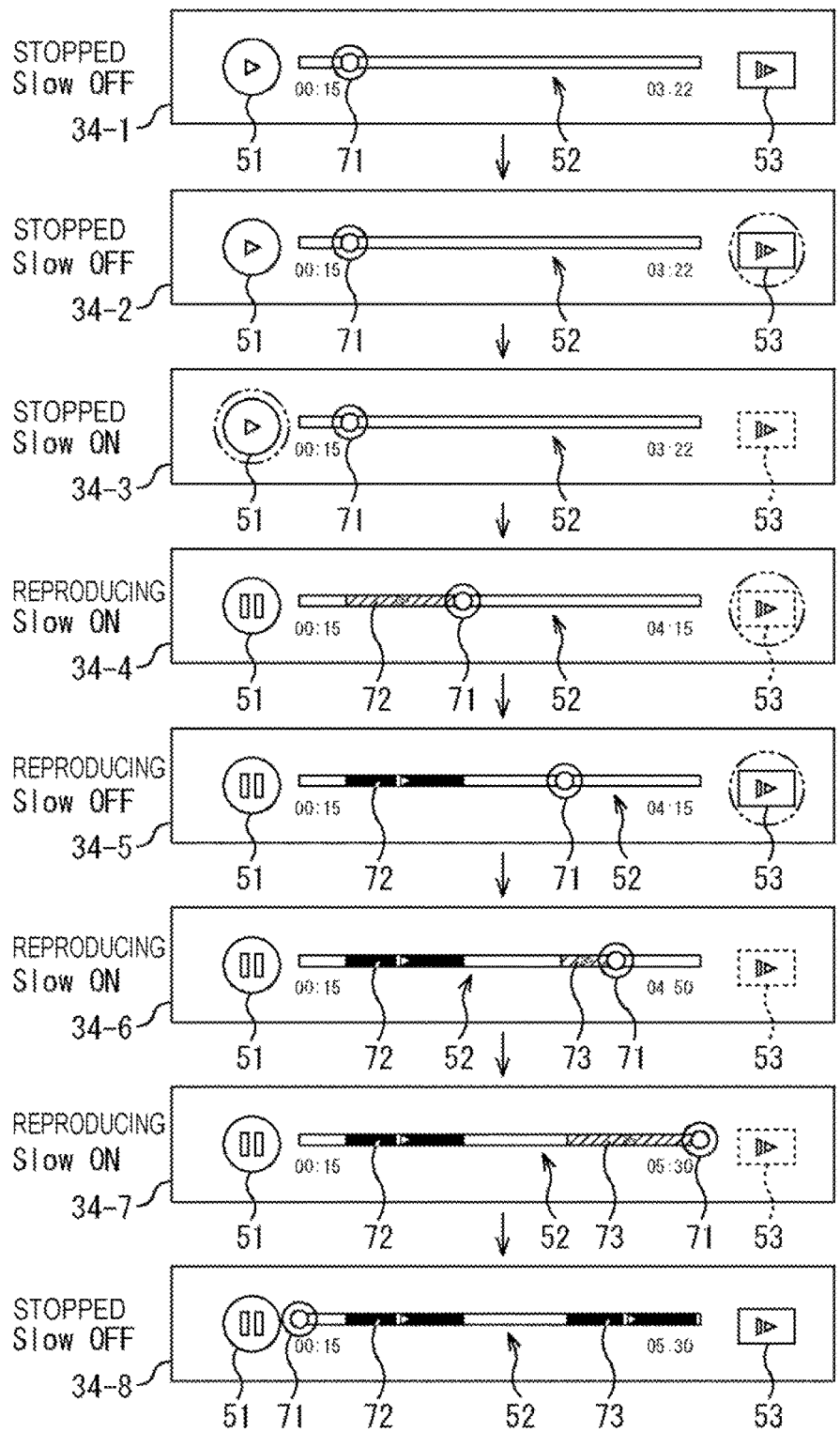
FIG. 7 is a figure which describes an editing process of a reproduction speed using a reproduction speed editing GUI display section.
Figure 9:
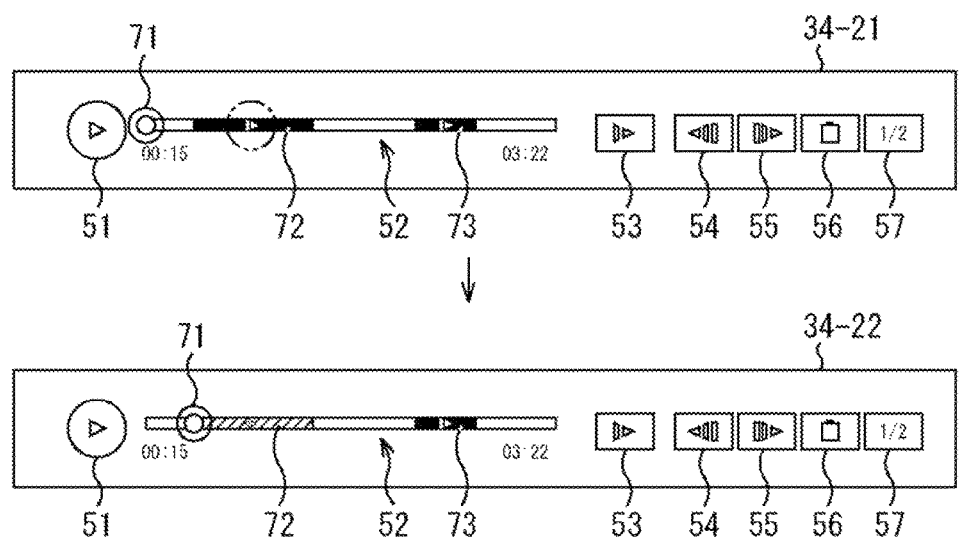
FIG. 9 is a figure which describes an editing process of a reproduction speed.

Further, in FIG. 7 through to FIG. 9, a portion operated by a user (for example, a portion touched by a user) is shown with an alternate long and short dashed line, and a slow reproduction start portion is specified, by having a user perform an operation for the slow portion setting button 53, such as shown in the reproduction speed editing GUI display section 34-2. In accordance with this, the GUI control section 26 (FIG. 1) acquires this operation information, and sets the slow reproduction start portion to the reproduction position shown by the slider 71. Afterwards, as shown in the reproduction speed editing GUI display section 34-3, slow reproduction (Slow ON) of a moving image is started during reproduction, by having a user perform an operation for the reproduction instruction button 51. Further, the slow portion setting button 53 is thinly displayed during slow reproduction of the moving image. After this, as shown in the reproduction speed editing GUI display section 34-4, a slow reproduction section 72 is shown with a thin hatching during reproduction. Then, a slow reproduction end portion is specified, by having a user perform an operation for the slow portion setting button 53.

In accordance with this, the GUI control section 26 acquires this operation information, and sets the slow reproduction end portion to a reproduction position shown by the slider 71, and the set slow reproduction section 72 is shown with a thick hatching, such as shown in the reproduction speed editing GUI display section 34-5. Then, reproduction of the moving image is reproduced with a usual speed (Slow OFF). After this, by having the same operations performed, a second slow reproduction section 73 is set, such as shown from the reproduction speed editing GUI display section 34-5 up to the reproduction speed editing GUI display section 34-8.

Figure 8:
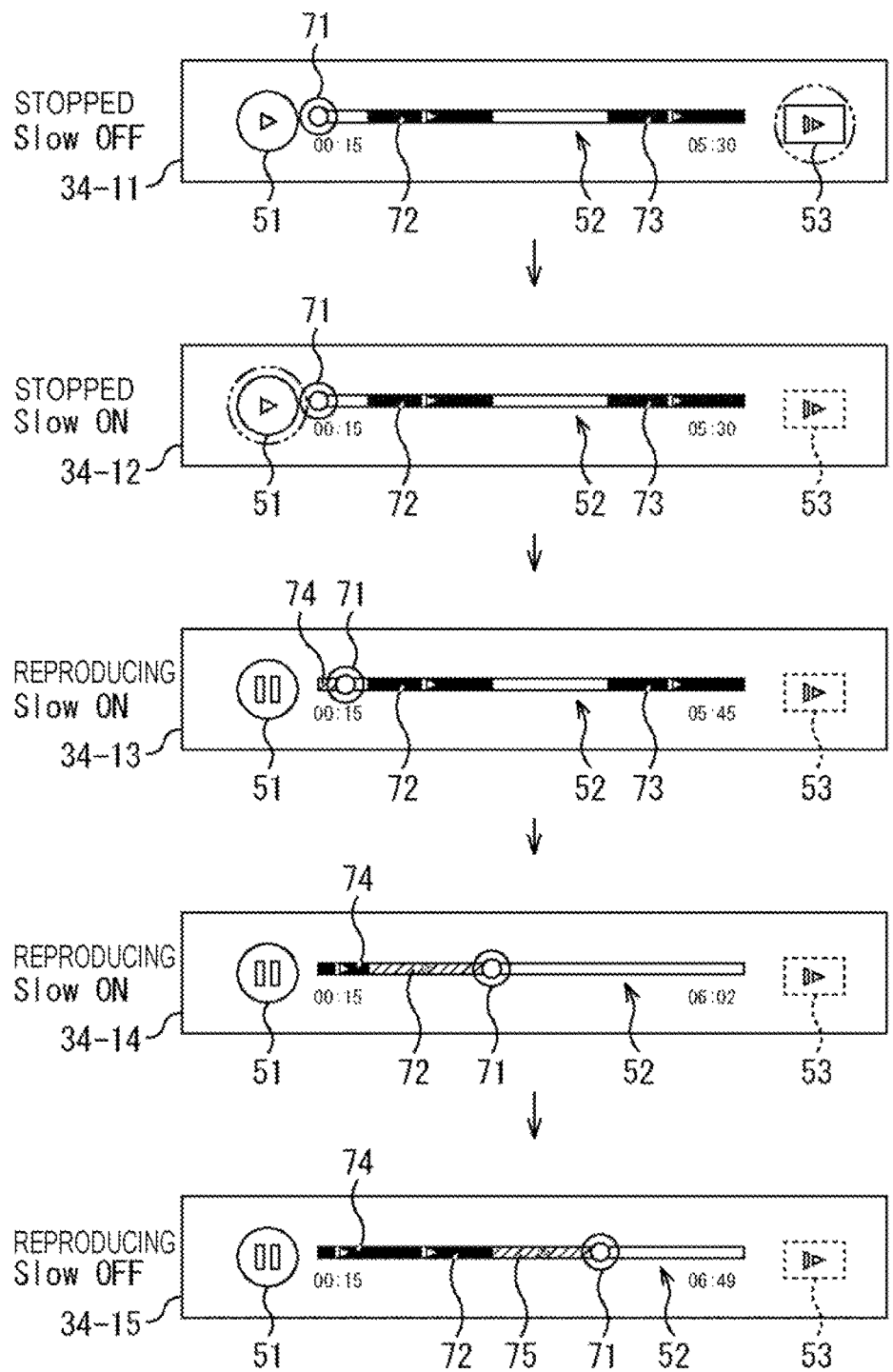
FIG. 8 is a figure which describes an editing process of a reproduction speed.

Further, after the slow reproduction sections 72 and 73 have been set such as this, additional slow reproduction sections can be set. That is, as shown in FIG. 8, when a moving image is reproduced from the beginning, in a state in which the slow reproduction sections 72 and 73 have been set, slow reproduction is instructed by performing an operation for the slow portion setting button 53, such as shown in the reproduction speed editing GUI display section 34-11. Then, as shown in the reproduction speed editing GUI display section 34-12, when a user performs an operation for the reproduction instruction button 51, slow reproduction is started, slow reproduction advances such as shown in the reproduction speed editing GUI display section 34-13, and a slow reproduction section 74 is set.

After this, when the slider 71 advances up to the slow reproduction start portion of the slow reproduction section 72, a slow reproduction section is continuously set from the slow reproduction section 74 to the slow reproduction section 72. Then, when the slider 71 advances up to the slow reproduction section 72, the slow reproduction section 72 is displayed with a thin hatching, such as shown in the reproduction speed editing GUI display section 34-14. In addition, when slow reproduction is performed, and the slider 71 advances prior to the slow reproduction section 72, a new slow reproduction section 75 is continuously set from the slow reproduction end portion of the slow reproduction section 72.

In this way, in the editing apparatus 11, slow reproduction sections can be set overlapping, and the slow reproduction section 74, the slow reproduction section 72 and the slow reproduction section 75 become a continuous slow reproduction section. Further, when an operation which selects a slow reproduction section is performed in the reproduction speed editing GUI display section 34, the reproduction position moves to the beginning of this selected slow reproduction section.

For example, at the time when the position of the slider 71 is at the beginning of the seek bar 52, such as the reproduction speed editing GUI display section 34-21 shown in FIG. 9, the slow reproduction section 72 is selected, by having a user perform an operation for the slow reproduction section 72. In accordance with this, the GUI control section 26 causes the slider 71 to move to the beginning of the slow reproduction section 72, such as shown in the reproduction speed editing GUI display section 34-22, by acquiring this operation information. Further, the slow reproduction section 72 selected at this time is thinly displayed. Note that, when reproduction (cue reproduction) of a moving image is performed by moving the slider 71 to the beginning of the slow reproduction section 72, in accordance with a selection of the slow reproduction section 72 such as this, reproduction may be performed from the beginning of the slow reproduction section 72, from a number of seconds prior, or from a number of frames prior.

Here, for example, when a click operation (a one-touch operation) is performed for the reverse direction movement button 54 and the travelling direction movement button 55, the selected slow reproduction section 72 moves one frame. Further, when a long click operation (continuous touching operation) is performed for the reverse direction movement button 54 and the travelling direction movement button 55, the selected slow reproduction section 72 continuously moves, while this operation is being performed. Note that, at the time when the slow reproduction section 72 comes into contact with the beginning or end of the seek bar 52, or the other slow reproduction section 73, movement from here onwards is not performed.

Further, when scanning is performed for the slow portion deletion button 56, in a state in which the slow reproduction section 72 is selected, the slow reproduction section 72 is deleted. Further, at the time when the slow reproduction speed of the selected slow reproduction section 72 changes, by an operation for the reproduction speed instruction drop down list 57, the entire reproduction time of the moving image (a total reproduction time) changes, in accordance with the change of the slow reproduction speed. In addition, the slow reproduction section 72 can be displayed with a color set in accordance with the slow reproduction speed, by the reproduction speed editing GUI display section 34.

In addition, for example, by performing an operation for both ends, in a state in which the slow reproduction section 72 is selected, the length of the slow reproduction section 72 can be enlarged or reduced. For example, a prescribed width (for example, two pixels) inside from both ends of the slow reproduction section 72 is capable of being selected. Note that, the length of the slow reproduction section 72 can be enlarged or reduced, by performing an operation on both ends of the slow reproduction section 72, even in a state where it is not selected. In addition, by performing an operation for the portion other than the prescribed width inside from these both ends, the slow reproduction section 72 can be moved. Note that, at the time when the slow reproduction section 72 comes into contact with the beginning or end of the seek bar 52, or the other slow reproduction section 73, movement from here onwards is not performed.

Figure 10:
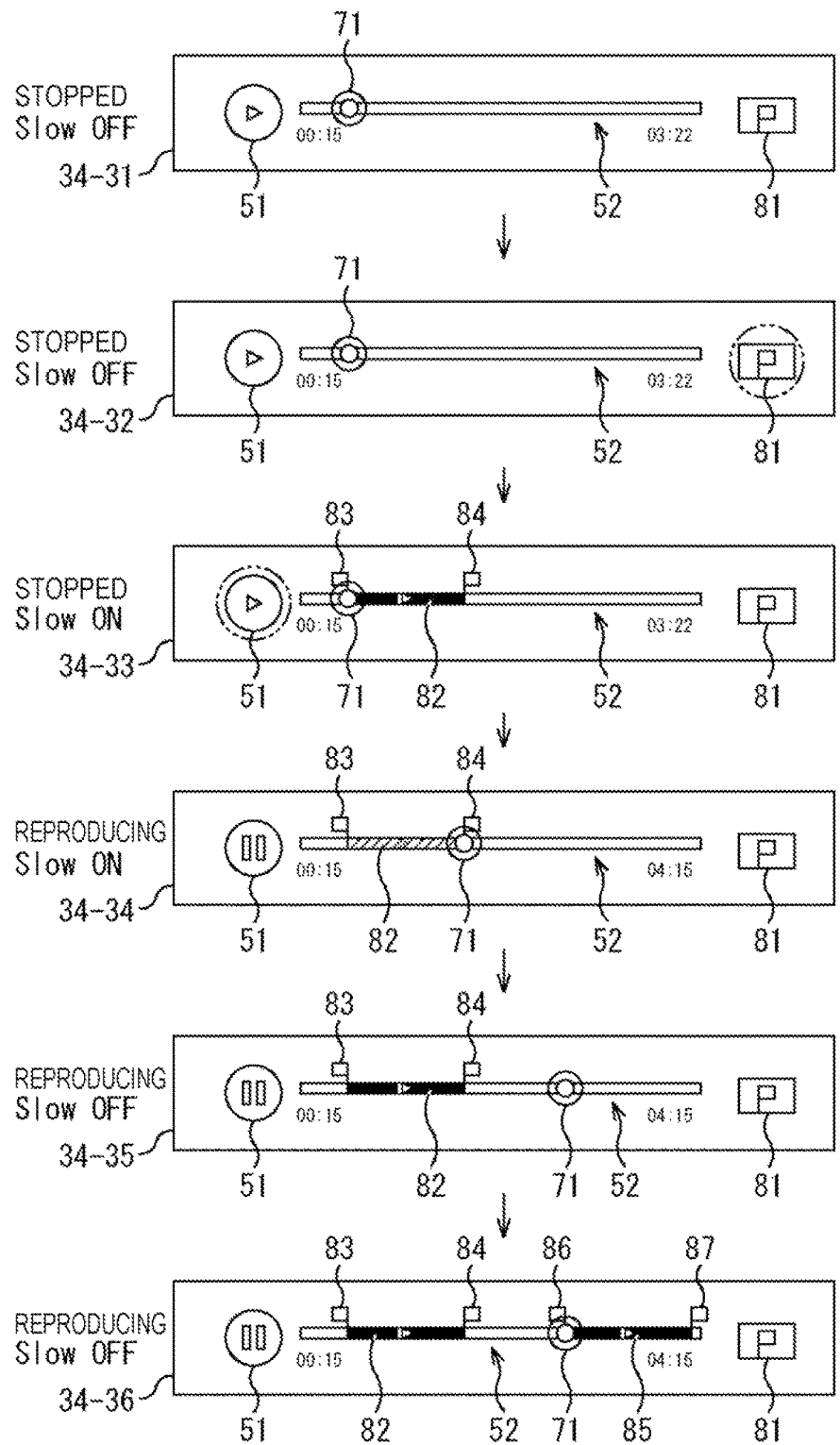
FIG. 10 is a figure which describes an editing process of a reproduction speed using a modified example of a reproduction speed editing GUI display section.

Next, a modified example of the reproduction speed editing GUI display section 34 will be described with reference to FIG. 10 through to FIG. 12. As shown in FIG. 10 through to FIG. 12, flags showing the slow reproduction section may be displayed, such as the slow reproduction start flag 65 and the slow reproduction end flag 66 shown in the track image 60 of FIG. 3, for the seek bar 52. At this time, an icon of a flag is displayed on the slow portion setting button 81. For example, when reproduction of a moving image is started with a usual speed (Slow OFF), the slider 71 moves on the seek bar 52, and when a user performs an operation for the reproduction instruction button 51, reproduction of the moving image temporarily stops. During such stopping of reproduction, a reproduction mark (a triangle facing the right) is displayed on the reproduction instruction button 51, such as shown in the reproduction speed editing GUI display section 34-31 of FIG. 10.

Figure 12:
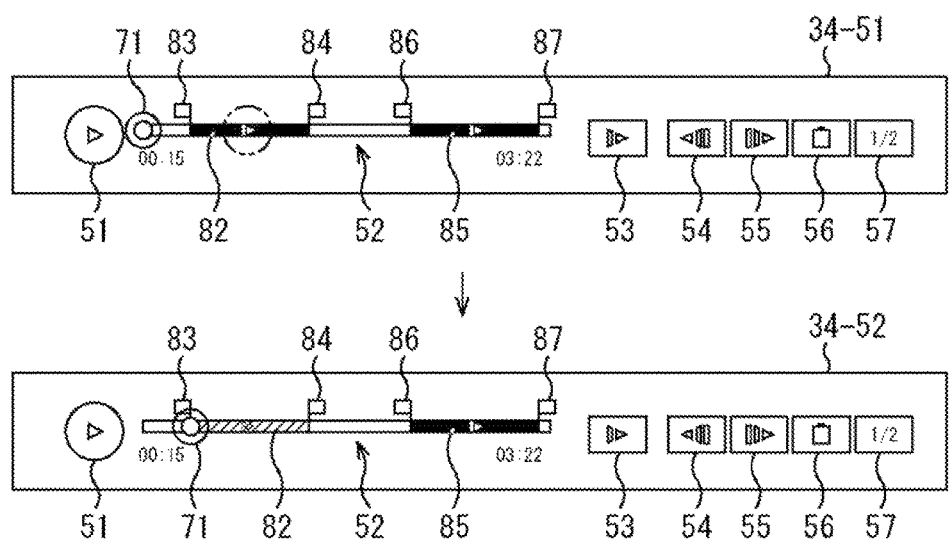
FIG. 12 is a figure which describes an editing process of a reproduction speed.

Further, in FIG. 10 through to FIG. 12, a portion operated by a user (for example, a portion touched by a user) is shown with an alternate long and short dashed line, and a slow reproduction start portion is specified, by having a user perform an operation for the slow portion setting button 81, such as shown in the reproduction speed editing GUI display section 34-32.

In accordance with this, the GUI control section 26 (FIG. 1) acquires this operation information, and sets a slow reproduction section 82, such as shown in the reproduction speed editing GUI display section 34-33, by setting a reproduction position displayed by the slider 71 to a slow reproduction start portion. That is, when an operation is performed for the slow portion setting button 81, a slow reproduction start flag 83 is set at a reproduction position of this time, and a slow reproduction end flag 84 is set at a portion separated a prescribed interval from the slow reproduction start flag 83. As shown in FIG. 10, the set slow reproduction section 82 is displayed with a thick hatching. In this way, after the slow reproduction start flag 83 and the slow reproduction end flag 84 are set with a one-time operation for the slow portion setting button 81, a user can enlarge or reduce the length of the slow reproduction section 82 by performing an operation for the slow reproduction start flag 83 and the slow reproduction end flag 84.

After this, when a user performs an operation for the reproduction instruction button 51, slow reproduction (Slow ON) of a moving image is started during reproduction, and the slider 71 advances up to the slow reproduction end flag 84. Then, when slow reproduction is performed as it is, the slow reproduction section 82 becomes a thin hatching, such as shown in the reproduction speed editing GUI display section 34-34, and the length of the slow reproduction section 82 is extended such as during editing. Then, the length of the slow reproduction section 82 is set, and the moving image is reproduced with a usual speed (Slow OFF), such as shown in the reproduction speed editing GUI display section 34-35. After this, by having the same operations performed, a second slow reproduction section 85 is set, such as shown in the reproduction speed editing GUI display section 34-36. Further, a slow reproduction start flag 86 is displayed at a slow reproduction start portion of the second slow reproduction section 85, and a slow reproduction end flag 87 is displayed at a slow reproduction end portion.

Figure 11:
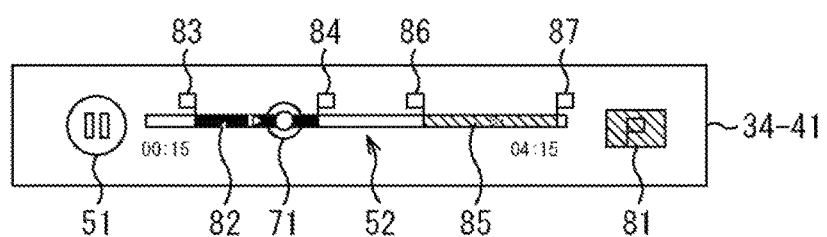
FIG. 11 is a figure which describes an editing process of a reproduction speed.

Further, as shown in the reproduction speed editing GUI display section 34-41 of FIG. 11, at the time during reproduction of the slow reproduction section 82 of the seek bar 52, the slider 71 is displayed on the slow reproduction section 82. In addition, at this time, the slow portion setting button 81 becomes a non-selected state, and setting slow reproduction sections overlapping is inhibited.

Further, similar to that described above with reference to FIG. 9, when an operation is performed which selects a slow reproduction section, the reproduction position moves to the beginning of this selected slow reproduction section. That is, at the time when the position of the slider 71 is at the beginning of the seek bar 52, such as the reproduction speed editing GUI display section 34-51 shown in FIG. 12, the slow reproduction section 82 is selected, by having a user perform an operation for the slow reproduction section 82. In accordance with this, the GUI control section 26 causes the slider 71 to move to the beginning of the slow reproduction section 82, such as shown in the reproduction speed editing GUI display section 34-52, by acquiring this operation information. Further, the slow reproduction section 82 selected at this time is thinly displayed.

Further, while the setting of slow reproduction sections using the seek bar 52 has been described in FIG. 7 though to FIG. 12, the settings of these slow reproduction sections can be performed with the same operation for the track image 60 shown in FIG. 3. In this case, for example, by displaying the track image 60 enlarged, the operability can be improved.

Further, while an example which edits the reproduction speed of two moving images has been described in the present embodiment, editing of the reproduction speed can be performed, for example, in the editing apparatus 11, by setting one moving image as an editing target, or setting three or more moving images as an editing target. Here, two or more moving images which become an editing target in the editing apparatus 11 may be moving images which respectively capture different angles (imaging directions) from an approximately same point, or may be moving images which respectively capture a main photographic subject from different angles. In addition, they may be moving images captured with an imaging apparatus included in a moving object moving with a prescribed speed. In addition, in a system constituted from a portable transmission and reception device capable of wirelessly transmitting and sending imaging start and end instructions, and a plurality of portable imaging apparatuses wirelessly connected to the portable transmission and reception device, two or more moving images may respectively be (a group of) moving images captured by the plurality of imaging apparatuses in accordance with the imaging start and end instructions from the portable transmission and reception device.

Further, for example, in addition to being captured by an imaging apparatus included in a vehicle, moving images set as an editing target can be used as moving images captured by an imaging apparatus worn on a player or referee in a sports event. Also, for example, a reproduction speed of a moving image can be edited so as to perform slow reproduction by selecting a scene in which the audience is excited, a scene in which the score is determined or the like.

In addition, other than information showing the position of an actual space, information showing the position in a virtual space can be used, as position information used as additional information of a moving image. For example, a moving image can be recorded so as to move in accordance with an operation of a user within a virtual space such as a game, or position information can be recorded on a virtual space along with this moving image. The editing apparatus 11 can edit the reproduction speed of the moving image recorded in a virtual space, by using position information in the virtual space.

Further, similar to editing a slow reproduction section, in the editing apparatus 11, for example, a fast-forward reproduction section reproduced with a fast-forward speed faster than a usual reproduction speed can be edited. Note that, while the editing apparatus 11 has been described in the present embodiment, a moving image can be reproduced such as shown in the main screen 32 of FIG. 2, in the reproduction apparatus which reproduces a moving image to which editing of a reproduction speed has been performed by the editing apparatus 11. That is, the reproduction apparatus can reproduce moving images in the moving image display sections 41-1 and 41-2, can generate a speed meter image and display the generated speed meter image on the speed meter image display section 42, and can generate a track image and display the generated track image on the track image display section 43. At this time, for example, when reproducing a moving image corresponding to a slow reproduction section, the reproduction apparatus can change the movement speed of the imaging point 62 on the route image 61 in the track image 60 such as shown in FIG. 3, in accordance with the reproduction speed of a changed moving image.

It should be noted that each process described referring to the flowchart above includes a process that is not necessarily performed in a time series manner in the order described in the flowchart, but may be performed in a parallel or individual manner (for example, a paralleled process or a process by objects). In addition, the program may be processed by one CPU, or processed by a plurality of CPUs in a distributed manner.

The above-described series of processing (an information processing method) may be performed by hardware or may be performed by software. When the series of processing is performed by software, a program forming the software is installed into a computer that is incorporated in a dedicated hardware, or installed from a program storage medium on which programs are recorded into a general-purpose personal computer, for example, that can perform various types of functions by installing various types of programs.

FIG. 13 is a block diagram showing an example configuration of the hardware of a computer that executes the series of processes described earlier according to a program. In the computer, a central processing unit (CPU) 101, a read only memory (ROM) 102 and a random access memory (RAM) 103 are mutually connected by a bus 104.

Further, an input/output interface 105 is connected to the bus 104. Connected to the input/output interface 105 are an input unit 106 formed by a keyboard, a mouse, a microphone and the like, an output unit 107 formed by a display, a speaker and the like, a storage unit 108 formed by a hard disk, a nonvolatile memory and the like, a communication unit 109 formed by a network interface and the like, and a drive 110 that drives a removable medium 111 that is a magnetic disk, an optical disk, a magneto-optical disk, or a semiconductor memory etc.

In the computer configured as described above, the CPU 101 loads a program that is stored, for example, in the storage unit 108 onto the RAM 103 via the input/output interface 105 and the bus 104, and executes the program. Thus, the above-described series of processing is performed. The program executed by the computer (the CPU 101) is recorded in the removable medium 111, which is a package medium formed by, for example, a magnetic disc (including a flexible disk), an optical disk (a compact disc read only memory (CD-ROM), a digital versatile disc (DVD) or the like), a magneto optical disk, or a semiconductor memory etc. Alternatively, the program is provided via a wired or wireless transmission medium, such as a local area network, the Internet and a digital satellite broadcast. Then, by inserting the removable medium 111 into the drive 110, the program can be installed in the storage unit 108 via the input/output interface 105. Further, the program can be received by the communication unit 109 via a wired or wireless transmission medium and installed in the storage unit 108. Moreover, the program can be installed in advance in the ROM 102 or the storage unit 108.

Note that, the present disclosure can also be configured such as follows:

(1) An editing apparatus, including:
   an image reproduction section which reproduces a moving image;
   a track image generation section which generates a track image including at least a route image showing a track from a start point up to an end point corresponding to imaging positions at a time of imaging of the moving image; and
   an editing information acquisition section which acquires editing information for editing a reproduction speed of the moving image by using the track image.

(2) The editing apparatus according to (1),
   wherein the track image further includes an imaging point display so as to move in accordance with an imaging time of the moving image, and
   wherein the track image generation section generates the track image in which the imaging point display is displayed superimposed on the route image.

(3) The editing apparatus according to (1) or (2), further including:
   a speed meter image generation section which generates a speed meter image showing a speed corresponding to an imaging time in accordance with speed information showing a movement speed at a time of imaging of the moving image, and causing the generated speed meter image to be displayed superimposed on a moving image reproduced by the image reproduction section.

(4) The editing apparatus according to any of (1) to (3),
   wherein, at a time when a variable speed reproduction section reproduced with a reproduction speed different to a usual reproduction speed is set in accordance with editing of a reproduction speed of the moving image, the track image generation section displays the variable speed reproduction section on the route image.

(5) The editing apparatus according to (4),
   wherein the track image generation section generates the track image in which flags are displayed showing respective positions at a start position and an end position of the variable speed reproduction section.

(6) The editing apparatus according to (5),
   wherein the flags displayed at the start position and end position of the variable speed reproduction section are displayed with a color different to a color of other flags displayed in the track image.

(7) The editing apparatus according to any of (4) to (6),
   wherein a color displaying the variable speed reproduction section is set in accordance with a reproduction speed in the variable speed reproduction section.

(8)
   The editing apparatus according to any of (4) to (7),
   wherein the editing information acquisition section acquires editing information for causing the variable speed reproduction section to move in accordance with an operation for the variable speed reproduction section.

(9) The editing apparatus according to any of (5) to (8),
   wherein the editing information acquisition section acquires editing information for causing the variable speed reproduction section to enlarge or reduce in accordance with an operation for the flags displayed at a start position and an end position of the variable speed reproduction section.

(10) The editing apparatus according to any of (1) to (9),
   wherein the editing information acquisition section acquires editing information for editing a reproduction speed of the moving image in accordance with an operation for a seek bar composed of a timeline showing an entire reproduction time of the moving image and a slider showing a reproduction position on the timeline.

(11) The editing apparatus according to any of (1) to (10),
   wherein the image reproduction section sets, to a reproduction target, a moving image in which a portion captured with a usual frame rate and a portion captured with a frame rate higher than a usual frame rate are mixed.

(12) A reproduction apparatus, including:
   an image reproduction section which reproduces a moving image; and
   a track image generation section which generates a route image showing a track from a start point up to an end point corresponding to imaging positions at a time of imaging of the moving image, and a track image including an imaging point display displayed superimposed on the route image so as to move in accordance with an imaging time of the moving image,
   wherein, when a moving image corresponding to a variable speed reproduction section displayed in the route image is displayed, the track image reproduction section changes and reproduces a movement speed of the imaging point display in accordance with a reproduction speed of a changed moving image.

(13) An editing method, including:
   reproducing a moving image;
   generating a track image including at least a route image showing a track from a start point up to an end point corresponding to imaging positions at a time of imaging of the moving image; and
   acquiring editing information for editing a reproduction speed of the moving image by using the track image.

(14) A reproduction method, including:
   reproducing a moving image; and
   generating a route image showing a track from a start point up to an end point corresponding to imaging positions at a time of imaging of the moving image, and a track image including an imaging point display displayed superimposed on the route image so as to move in accordance with an imaging time of the moving image,
   wherein, when a moving image corresponding to a variable speed reproduction section displayed in the route image is displayed, a movement speed of the imaging point display is changed and reproduced in accordance with a reproduction speed of a changed moving image.

(15) A program for causing a computer to execute an editing process including:
   reproducing a moving image;
   generating a track image including at least a route image showing a track from a start point up to an end point corresponding to imaging positions at a time of imaging of the moving image; and
   acquiring editing information for editing a reproduction speed of the moving image by using the track image.

(16) A program for causing a computer to execute a reproduction process including:
   reproducing a moving image; and
generating a route image showing a track from a start point up to an end point corresponding to imaging positions at a time of imaging of the moving image, and a track image including an imaging point display displayed superimposed on the route image so as to move in accordance with an imaging time of the moving image, wherein, when a moving image corresponding to a variable speed reproduction section displayed in the route image is displayed, a movement speed of the imaging point display is changed and reproduced in accordance with a reproduction speed of a changed moving image.

Note that, the present embodiment is not limited to the above described embodiments, and various types of changes are possible in a range which does not deviate from the content of the present disclosure.

What is claimed is:

1. An editing apparatus, comprising:
   circuitry configured to:
   receive a plurality of moving images specified as an editing target to edit a reproduction speed of the plurality of moving images;
   generate route information indicating an imaging start point on a timeline of the editing target to an imaging end point on the timeline of the editing target,
   wherein the timeline corresponds to a reproduction time of the editing target;
   display a route image on a display screen based on the generated route information;
   receive a first user input indicating a start point of a variable speed reproduction portion on the route image and a second user input indicating an end point of the variable speed reproduction portion,
   wherein a first reproduction speed of the editing target in the variable speed reproduction portion of the route image is different from a second reproduction speed of the editing target in the route image other than the variable speed reproduction portion, and
   wherein the end point is prior to the imaging end point and the start point is after the imaging start point;
   set, on the route image, the variable speed reproduction portion based on the start point and the end point indicated by the first user input and the second user input;
   receive a third user input to select the first reproduction speed of the editing target in the variable speed reproduction portion
   generate control information based on the set variable speed reproduction portion and based on the selected first reproduction speed of the editing target in the variable speed reproduction portion; and
   reproduce the editing target in the variable speed reproduction portion based on the control information.

2. The editing apparatus according to claim 1,
   wherein the route information includes an imaging point display that corresponds to a reproduction position on the timeline,
   wherein the imaging point display moves based on an imaging time of the editing target, and
   wherein the circuitry is further configured to display the imaging point display superimposed on the route image.

3. The editing apparatus according to claim 1, wherein the circuitry is further configured to:
   generate speed information that corresponds to an imaging time of the editing target,
   wherein the speed information is generated based on a movement speed at a time at which the editing target is imaged; and
   superimpose the speed information on the editing target.

4. The editing apparatus according to claim 1, wherein the circuitry is further configured to display the variable speed reproduction portion in the route image.

5. The editing apparatus according to claim 1, wherein the circuitry is further configured to display the start point and the end point with a first color different from a second color of the imaging start point and the imaging end point.

6. The editing apparatus according to claim 1, wherein a color of the variable speed reproduction portion is set based on the first reproduction speed of the editing target in the variable speed reproduction portion.

7. The editing apparatus according to claim 1, wherein the circuitry is further configured to generate the control information to cause the variable speed reproduction portion to move, wherein the variable speed reproduction portion is moved based on an operation for the variable speed reproduction portion.

8. The editing apparatus according to claim 1, wherein the circuitry is further configured to generate the control information to change a size of the variable speed reproduction portion, wherein the size of the variable speed reproduction portion is changed based on a first operation at the start point of the variable speed reproduction portion and a second operation at the end point of the variable speed reproduction portion.

9. The editing apparatus according to claim 1, wherein the circuitry is further configured to generate the control information to control the first reproduction speed, wherein the first reproduction speed is controlled based on an operation for a seek bar that corresponds to the timeline and a slider that shows a reproduction position on the timeline.

10. The editing apparatus according to claim 1, wherein the editing target comprises a first portion captured at a first frame rate and a second portion captured at a second frame rate higher than the first frame rate.

11. The editing apparatus of claim 1, wherein the circuitry is further configured to adjust the reproduction time of the editing target, based on the control information.

12. A reproduction apparatus, comprising:
    circuitry configured to:
    receive a plurality of moving images specified as an editing target to edit a reproduction speed of the plurality of moving images;
    generate route information indicating an imaging start point on a timeline of the editing target to an imaging end point on the timeline of the editing target,
    wherein the timeline corresponds to a reproduction time of the editing target;
    display a route image on a display screen based on the generated route information;
    receive a first user input indicating a start point of a variable speed reproduction portion on the route image and a second user input indicating an end point of the variable speed reproduction portion,
    wherein a first reproduction speed of the editing target in the variable speed reproduction portion of the route image is different from a second reproduction speed of the editing target in the route image other than the variable speed reproduction portion, and
    wherein the end point is prior to the imaging end point and the start point is after the imaging start point;
    generate an imaging point display configured to move based on an imaging time of the editing target;
    control display of the imaging point display such that the imaging point display is superimposed on the route image;

set, on the route image, the variable speed reproduction portion based on the start point and the end point indicated by the first user input and the second user input;

receive a third user input to select the first reproduction speed of the editing target in the variable speed reproduction portion; and change a movement speed of the imaging point display based on the first reproduction speed of the variable speed reproduction portion.

13. An editing method, comprising:

receiving a plurality of moving images specified as an editing target to edit a reproduction speed of the plurality of moving images;

generating route information indicating an imaging start point on a timeline of the editing target to an imaging end point on the timeline of the editing target, wherein the timeline corresponds to a reproduction time of the editing target;

displaying a route image on a display screen based on the generated route information;

receiving a first user input indicating a start point of a variable speed reproduction portion on the route image and a second user input indicating an end point of the variable speed reproduction portion, wherein a first reproduction speed of the editing target in the variable speed reproduction portion of the route image is different from a second reproduction speed of the editing target in the route image other than the variable speed reproduction portion, and wherein the end point is prior to the imaging end point and the start point is after the imaging start point;

setting, on the route image, the variable speed reproduction portion based on the start point and the end point indicated by the first user input and the second user input;

receiving third user input to select the first reproduction speed of the editing target in the variable speed reproduction portion;

generating control information based on the set variable speed reproduction portion and based on the selected first reproduction speed of the editing target in the variable speed reproduction portion; and reproducing the editing target in the variable speed reproduction portion based on the control information.

14. A reproduction method, comprising:

receiving a plurality of moving images specified as an editing target to edit a reproduction speed of the plurality of moving images;

generating route information indicating an imaging start point on a timeline of the editing target to an imaging end point on the timeline of the editing target, wherein the timeline corresponds to a reproduction time of the editing target;

displaying a route image on a display screen based on the generated route information;

receiving a first user input indicating a start point of a variable speed reproduction portion on the route image and a second user input indicating an end point of the variable speed reproduction portion, wherein a first reproduction speed of the editing target in the variable speed reproduction portion of the route image is different from a second reproduction speed of the editing target in the route image other than the variable speed reproduction portion, and wherein the end point is prior to the imaging end point and the start point is after the imaging start point;

generating an imaging point display configured to move based on an imaging time of the editing target;

displaying the imaging point display superimposed on the route image;

setting, on the route image, the variable speed reproduction portion based on the start point and the end point indicated by the first user input and the second user input;

receiving a third user input to select the first reproduction speed of the editing target in the variable speed reproduction portion; and changing a first movement speed of the imaging point display based on the first reproduction speed of the variable speed reproduction portion.

15. A non-transitory computer-readable medium having stored thereon, computer-executable instructions, which when executed by a computer, cause the computer to execute operations, the operations comprising:

receiving a plurality of moving images specified as an editing target to edit a reproduction speed of the plurality of moving images;

generating route information indicating an imaging start point on a timeline of the editing target to an imaging end point on the timeline of the editing target, wherein the timeline corresponds to a reproduction time of the editing target;

displaying a route image on a display screen based on the generated route information;

receiving a first user input indicating a start point of a variable speed reproduction portion on the route image and a second user input indicating an end point of the variable speed reproduction portion, wherein a first reproduction speed of the editing target in the variable speed reproduction portion of the route image is different from a second reproduction speed of the editing target in the route image other than the variable speed reproduction portion, and wherein the end point is prior to the imaging end point and the start point is after the imaging start point;

setting, on the route image, the variable speed reproduction portion based on the start point and the end point indicated by the first user input and the second user input;

receiving third user input to select the first reproduction speed of the editing target in the variable speed reproduction portion;

generating control information based on the set variable speed reproduction portion and based on the selected first reproduction speed of the editing target in the variable speed reproduction portion; and reproducing the editing target in the variable speed reproduction portion based on the control information.

16. A non-transitory computer-readable medium having stored thereon, computer-executable instructions, which when executed by a computer, cause the computer to execute operations, the operations comprising:

receiving a plurality of moving images specified as an editing target to edit a reproduction speed of the plurality of moving images;

generating route information indicating an imaging start point on a timeline of the editing target to an imaging end point on the timeline of the editing target, wherein the timeline corresponds to a reproduction time of the editing target;

displaying a route image on a display screen based on the generated route information;

receiving a first user input indicating a start point of a variable speed reproduction portion on the route image and a second user input indicating an end point of the variable speed reproduction portion, wherein a first reproduction speed of the editing target in the variable speed reproduction portion of the route image is different from a second reproduction speed of the editing target in the route image other than the variable speed reproduction portion, and wherein the end point is prior to the imaging end point and the start point is after the imaging start point;

generating an imaging point display configured to move based on an imaging time of the editing target;

displaying the imaging point display superimposed on the route image;

setting, on the route image, the variable speed reproduction portion based on the start point and an end point indicated by the first user input and the second user input;

receiving a third user input to select the first reproduction speed of the editing target in the variable speed reproduction portion; and changing a movement speed of the imaging point display based on the first reproduction speed of the variable speed reproduction portion.

17. The non-transitory computer-readable medium of claim 16, wherein the imaging point display corresponds to a reproduction position on the timeline.

18. The non-transitory computer-readable medium of claim 16, further comprising:
generating speed information that corresponds to the imaging time of the editing target,
wherein the speed information is generated based on a second movement speed at a time at which the editing target is imaged; and
superimposing the speed information on the editing target.

19. The non-transitory computer-readable medium of claim 16, further comprising displaying the variable speed reproduction portion in the route image.

20. The non-transitory computer-readable medium of claim 16, wherein the start point and the end point are displayed with a first color different from a second color of the imaging start point and the imaging end point.

21. The non-transitory computer-readable medium of claim 16, wherein a color of the variable speed reproduction portion is set based on the reproduction speed of the editing target in the variable speed reproduction portion.

22. The non-transitory computer-readable medium of claim 16, further comprising adjusting the reproduction time of the editing target.

* * * * *